United States Patent
Vedantam et al.

(10) Patent No.: US 6,655,913 B2
(45) Date of Patent: Dec. 2, 2003

(54) COMPOSITE TUBULAR WOVEN SEAL FOR AN INNER COMPRESSOR DISCHARGE CASE

(75) Inventors: Srikanth Vedantam, Niskayuna, NY (US); Mahmut Faruk Aksit, Istanbul (TR); Ahmad Safi, Troy, NY (US); Abdul-Azeez Mohammed-Fakir, Schenectady, NY (US); Ning Fang, West Chester, OH (US)

(73) Assignee: General Electric Company, Schenectady, NY (US)

( * ) Notice: Subject to any disclaimer, the term of this patent is extended or adjusted under 35 U.S.C. 154(b) by 61 days.

(21) Appl. No.: 10/045,023

(22) Filed: Jan. 15, 2002

(65) Prior Publication Data

US 2003/0133792 A1 Jul. 17, 2003

(51) Int. Cl.[7] ............................................... F01D 25/28
(52) U.S. Cl. ..................................................... 415/214.1
(58) Field of Search ................................ 415/135, 139, 415/213.1, 214.1, 215.1, 220; 277/608, 628, 641, 652, 653, 906

(56) References Cited

U.S. PATENT DOCUMENTS

| | | |
|---|---|---|
| 2,683,017 A * | 7/1954 | Gallaway ............ 415/214.1 X |
| 4,184,689 A | 1/1980 | Brodell et al. |
| 4,645,217 A | 2/1987 | Honeycutt, Jr. et al. |
| 4,815,933 A | 3/1989 | Hansel et al. |
| 4,863,343 A | 9/1989 | Smed |
| 5,149,250 A | 9/1992 | Plemmons et al. |
| 5,271,714 A | 12/1993 | Shepherd et al. |
| 5,301,595 A * | 4/1994 | Kessie .................... 277/653 X |
| 5,372,476 A | 12/1994 | Hemmelgarn et al. |
| 5,474,306 A | 12/1995 | Bagepalli et al. |
| 5,509,669 A | 4/1996 | Wolfe et al. |
| 5,586,773 A | 12/1996 | Bagepalli et al. |
| 5,657,998 A | 8/1997 | Dinc et al. |
| 5,915,697 A | 6/1999 | Bagepalli et al. |
| 5,934,687 A | 8/1999 | Bagepalli et al. |
| 6,095,750 A | 8/2000 | Ross et al. |
| 6,162,014 A | 12/2000 | Bagepalli et al. |

* cited by examiner

*Primary Examiner*—Edward K. Look
*Assistant Examiner*—Richard A. Edgar
(74) *Attorney, Agent, or Firm*—Nixon & Vanderhye

(57) ABSTRACT

Upper and lower halves of the inner barrel of a compressor for a turbine are bolted to one another along a horizontal midline joint with metal-to-metal surface contact. Elongated grooves are provided in the margin of one of the barrel halves. Elongated composite tubular woven seals are provided in the grooves, the seals having a diameter in excess of the depth of the grooves. The seals comprise an inner woven metal core surrounded by an annular silica fiber layer, in turn surrounded by a metal foil with an outer protective covering of a braided stainless steel. Upon joining the upper and lower halves, the compliant seal is crushed within the groove, maintaining a seal between the barrel halves in the event of warpage of the compressor casing during turbine operation.

6 Claims, 3 Drawing Sheets

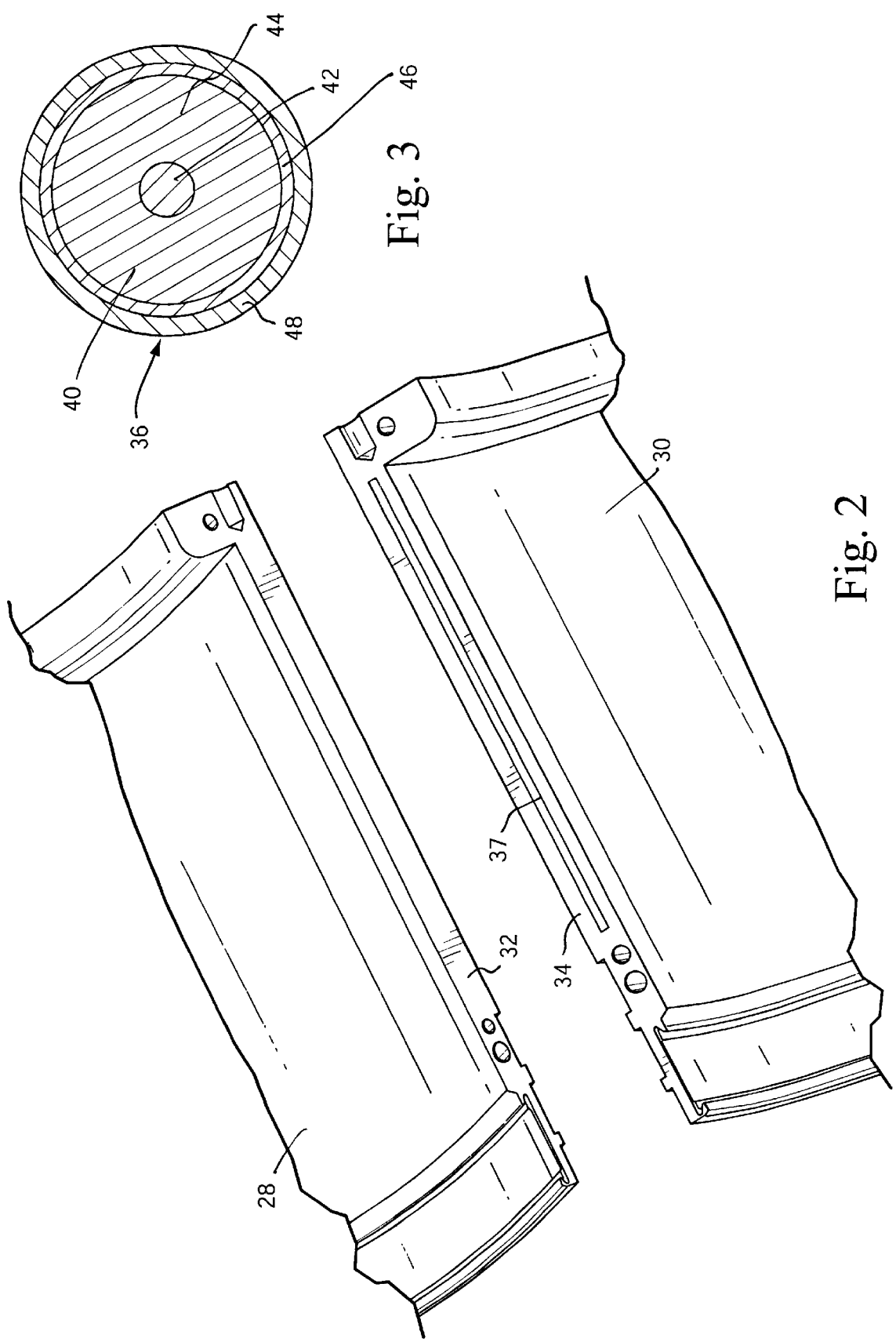

COMPOSITE TUBULAR WOVEN SEAL FOR AN INNER COMPRESSOR DISCHARGE CASE

BACKGROUND OF THE INVENTION

The present invention relates to a seal between upper and lower halves of an inner compressor discharge case and particularly to a seal between the case halves tolerant of warpage during turbine operation.

In a turbine, e.g., a gas turbine, the compressor section includes a stationary inner barrel formed of two semi-cylindrical halves secured one to the other generally along a horizontal midline forming an annulus. The aft end of the inner barrel is secured to a compressor discharge casing which provides support for the nozzle support ring supporting the first-stage nozzle. The inner barrel, in part, segregates a high-pressure region external to the barrel from a lower pressure region within the barrel and about the rotor. The barrel halves at the horizontal midline have metal-to-metal contact surfaces which are machined to high tolerances in efforts to eliminate leakage after assembly and during use. However, warpage during operation of the turbine due to creep can leave a gap of approximately 5 to 7 mils at the bolted horizontal joints between the upper and lower halves of the inner barrel. As a consequence, leakage paths can and do appear between the halves of the inner barrel. A need has therefore arisen to minimize or eliminate any such leakage paths in a manner which is tolerant to warpage during turbine operation.

BRIEF DESCRIPTION OF THE INVENTION

In accordance with a preferred embodiment of the present invention, there is provided a seal for application along the registering and joined horizontal margins of the halves of the inner compressor discharge case, i.e., the inner barrel, in a manner tolerant to warpage of the inner barrel during turbine operation. Particularly, grooves are machined along the margins of one of the upper and lower barrel halves and between the bolts at axially opposite ends of the one barrel half. The margins along the other barrel half are machined to form a sealing surface and are not provided with grooves. A composite tubular woven seal is provided in each of the grooves of the one barrel half and projects outwardly of the margin of each groove such that, upon joining the halves to one another along the mating margins, the composite tubular woven seal is compressed to compliantly seal against the machined surfaces of the margins of the other barrel half.

Particularly, the composite tubular woven seal is compliant as a result of the multiple layers forming the seal. The layers include an inner woven metal core, a fiber material, a metallic foil and a metal outer covering. Preferably, the inner metal core is formed of a woven stainless steel which is surrounded by a silica fiber. The fiber, in turn, is surrounded by a stainless steel metal foil and the outer covering is formed of a braided material, for example, Haynes 188. Because of the nature of the composite tubular woven seal, the seal is compliant, particularly as a result of the resiliency of the metal core and surrounding silica fiber. Moreover, the metal foil layer surrounding the fiber prevents leakage between the margins of the barrel halves, while the braided outer covering serves as a protective wear surface. The inner metal core and silica fibers tend to retain their generally circular configuration in cross-section such that the seal, when compressed between the margins of the barrel halves, is preloaded or biased for return to its circular cross-sectional configuration. In this manner, any leakage flow through gaps formed as a result of warpage during turbine operation are sealed by the composite tubular woven seal.

In a preferred embodiment of the present invention, there is provided an inner compressor discharge case for a gas turbine, comprising a cylindrical barrel formed of upper and lower halves joined to one another at margins thereof along a horizontal midline to form a pair of diametrically opposed joints along opposite sides of the barrel, each of the margins of one of the halves having a groove extending generally parallel to an axis of the cylindrical barrel, each of the margins of another of the halves having a sealing surface extending generally parallel to the axis of the cylindrical barrel, a compliant seal disposed in each of the grooves including a seal body formed of multiple layers of different materials for compliantly and sealingly engaging against the margin of another of the halves upon securing the halves to one another.

BRIEF DESCRIPTION OF THE DRAWINGS

FIG. 2 is a fragmentary perspective view illustrating upper and lower margins of the upper and lower halves of the inner case;

FIG. 3 is an enlarged cross-sectional view of a composite tubular woven seal for sealing between the halves of the inner case;

DETAILED DESCRIPTION OF THE INVENTION

Figure 1:
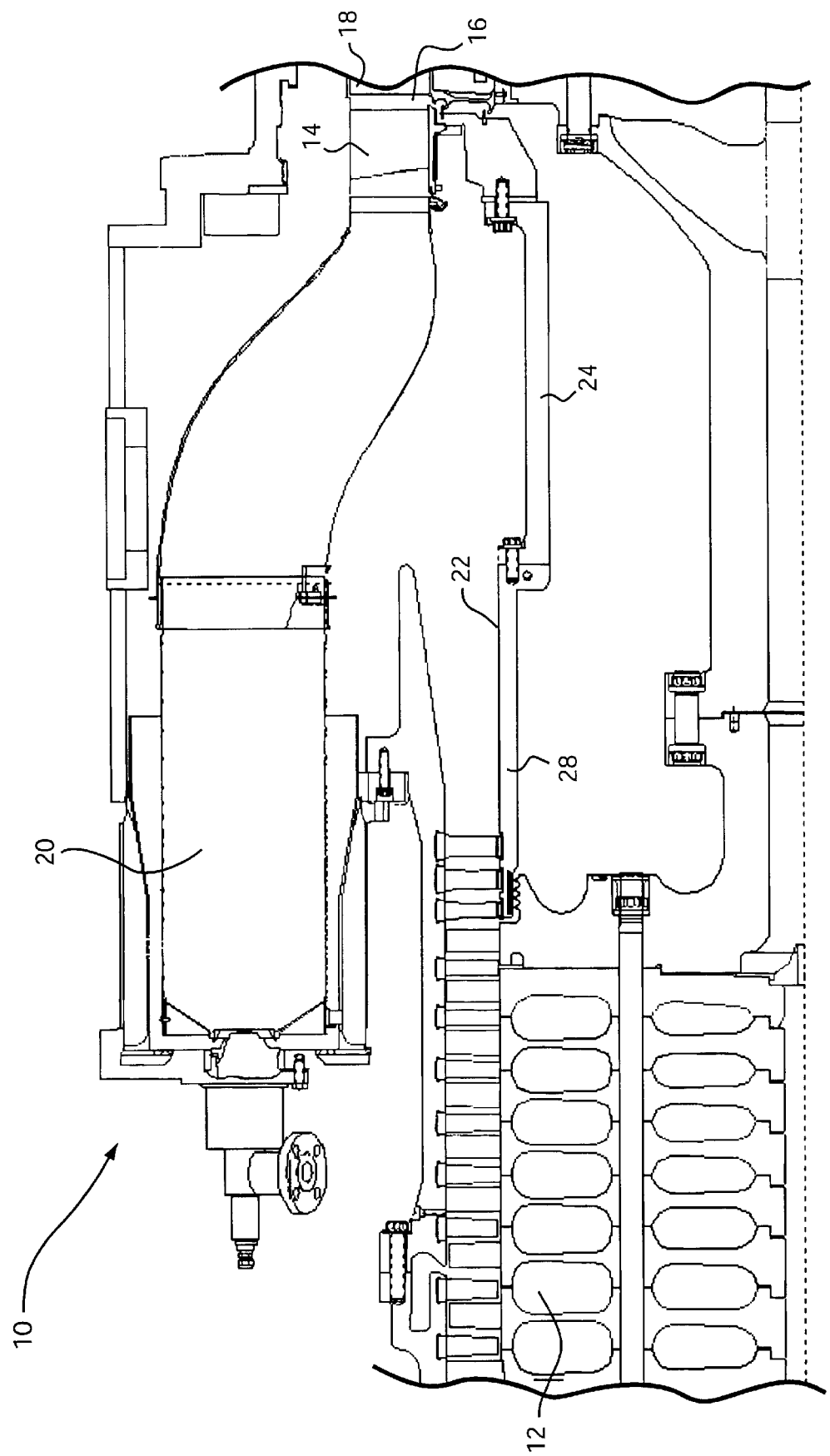
FIG. 1 is a schematic cross-sectional view of an upper half of a portion of a turbine illustrating an inner compressor discharge case.

Referring now to the drawings, particularly to FIG. 1, there is illustrated a portion of a gas turbine, generally designated 10, having a compressor section 12, a turbine section 14, including first-stage nozzles 16 and buckets 18, and one of a plurality of combustors 20 spaced circumferentially one from the other about the turbine. It will be appreciated that the compressor 12 provides compressed air for mixing with fuel in each of combustors 20 of the annular array thereof to provide hot gases of combustion from the combustors to the turbine section 14 to drive the turbine rotor. As is conventional, the compressor is provided with an inner compressor discharge case or inner barrel 22 and a compressor discharge casing 24. Casing 24 interconnects the inner barrel 22 and a first-stage nozzle support ring 26. The inner barrel 22 and compressor discharge case 24 are stationary and the inner barrel is conventionally formed of a pair of semi-cylindrical sections, e.g., upper and lower halves 28 and 30, respectively (FIG. 2), joined one to the other by bolts along a horizontal midline of the turbine. The barrel halves 28 and 30 are conventionally bolted to one another adjacent opposite ends with their margins or surfaces 32 and 34 respectively, abutting one another. As indicated previously, those margins 32 and 34 are typically machined to a high tolerance in efforts to preclude leakage at the horizontal midline. However, warpage during turbine operation due to creep can provide one or more gaps between the margins 32 and 34 when the halves are bolted to one another, resulting in leakage paths.

In accordance with a preferred embodiment of the present invention, a seal, generally designated 36 (FIG. 3), is provided between the upper and lower halves 28 and 30, respectively, in each of the horizontal midline joints. To provide the seal, a groove is formed in each of the margins of one of the barrel halves, e.g., the margin 34 of the lower barrel half 30 at the midline joint between the barrel halves and between the end bolts. Thus, a groove 37 is formed in the margin 34 of the lower barrel half 30 and extends longitudinally generally parallel to the axis of the rotor and between the end bolts. The margin 32 of the upper barrel half 28 is machined to a high tolerance and comprises a flat surface for engaging the margin 34 of the lower barrel half upon securement of the halves to one another.

The seal includes a seal body 40 having, in an uncompressed condition, a generally circular configuration in cross-section, as illustrated in FIG. 3. The seal body 40 is formed of multiple layers of material. Preferably, the innermost layer 42 comprises a woven metal core formed of a stainless steel material. Surrounding the metal core 42 is an annular layer of fiber, preferably a silica fiber 44. Surrounding the silica fiber 44 is a metal foil 46, preferably formed of stainless steel. Finally, the outer covering for the seal body 40 includes a metallic braided material 48, preferably a braided steel material such as Haynes 188. The composite tubular woven seal is compliant in a lateral direction, i.e., is biased or preloaded, to return to its circular cross-sectional shape in the event of compression.

Figure 4:
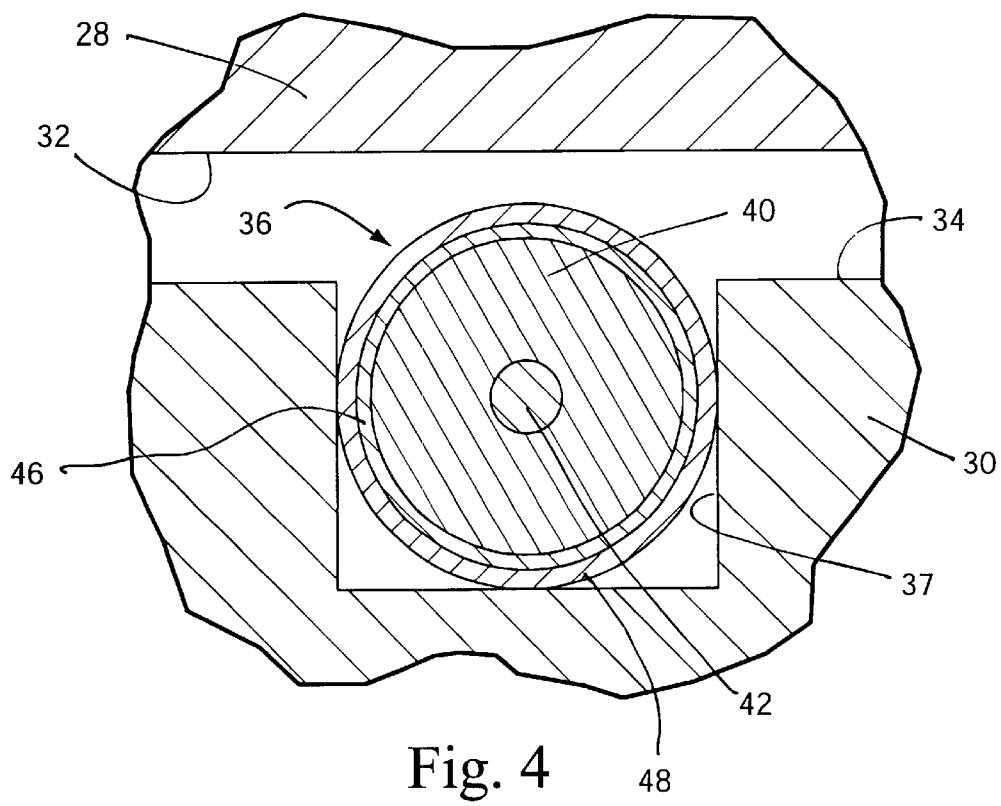
FIG. 4 is an enlarged fragmentary cross-sectional view illustrating the seal in a groove of one of the case halves.
Figure 5:
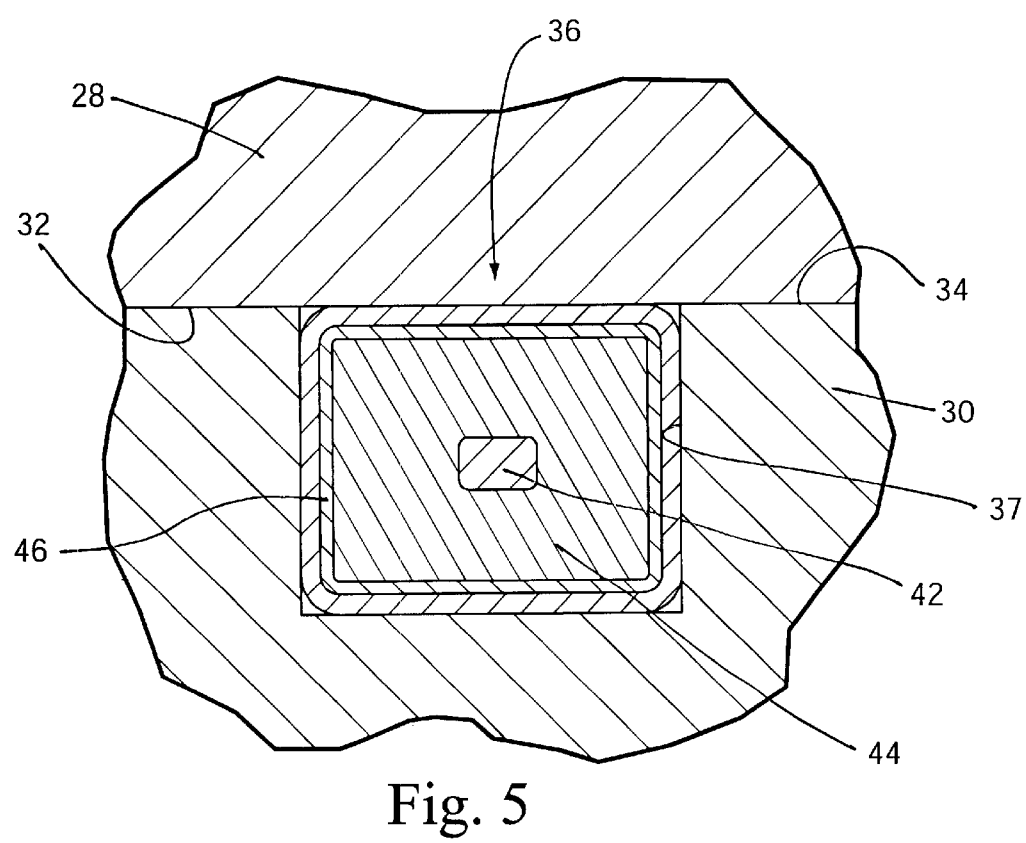
FIG. 5 is a view similar to FIG. 4 illustrating the seal between the case halves when secured to one another.

As illustrated in FIG. 4, the groove 37 formed in the lower barrel half 30 has a width corresponding generally to diameter of the seal body 40. However, the depth of the groove 37 is short of or less than the diameter of the seal body 40. Consequently, upon installation of the seal body 40 into groove 37, the composite tubular woven seal projects above the margin 34. Upon securement of the barrel halves 28 and 30 to one another by applying the end bolts, it will be appreciated that the margin 32 engages the seal body 40 as the barrel halves are drawn into securement relative to one another to compress or crush the seal body 40. As the halves are drawn to one another into the configuration illustrated in FIG. 5, it will be seen that the seal body 40 is compliantly compressed to substantially fill the volume of the groove 37. A surface portion of the elongated crushed seal body 40 lies in continuous engagement with the margin 32 of the upper barrel half 28 to form a seal therebetween. Accordingly, in the event of warpage during turbine operation forming a gap between the sealing margins 32 and 34, the compliant tubular woven seal remains in engagement between the barrel halves to minimize or prevent leakage paths between the barrel halves.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An inner compressor discharge case for a gas turbine, comprising:

a cylindrical barrel formed of upper and lower halves joined to one another at margins thereof alone a horizontal midline to form a pair of diametrically opposed joints along opposite sides of the barrel, each of the margins of one of said halves having a groove extending generally parallel to an axis of the cylindrical barrel, each of the margins of another of said halves having a sealing surface extending generally parallel to the axis of the cylindrical barrel;

a compliant seal disposed in each of said grooves including a seal body formed of multiple layers of different materials for compliantly and sealingly engaging against the margin of said another of said halves upon securing said halves to one another;

said materials of said seal body comprising a woven metal core, a fiber, a metallic foil and a protective layer.

2. An inner compressor discharge case for a gas turbine, comprising:

a cylindrical barrel formed of upper and lower halves joined to one another at margins thereof along a horizontal midline to form a pair of diametrically opposed joints along opposite sides of the barrel, each of the margins of one of said halves having a groove extending generally parallel to an axis of the cylindrical barrel, each of the margins of another of said halves having a sealing surface extending generally parallel to the axis of the cylindrical barrel;

a compliant seal disposed in each of said grooves including a seal body formed of multiple layers of different materials for compliantly and sealingly engaging against the margin of said another of said halves upon securing said halves to one another;

said materials of said seal body comprising an inner woven metal core, a silica fiber, a metal foil and a braided metal outer protective layer.

3. An inner compressor discharge case for a gas turbine, comprising:

a cylindrical barrel formed of upper and lower halves joined to one another at margins thereof along a horizontal midline to form a pair of diametrically opposed joints along opposite sides of the barrel, each of the margins of one of said halves having a groove extending generally parallel to an axis of the cylindrical barrel, each of the margins of another of said halves having a sealing surface extending generally parallel to the axis of the cylindrical barrel;

a compliant seal disposed in each of said grooves including a seal body formed of multiple layers of different materials for compliantly and sealingly engaging against the margin of said another of said halves upon securing said halves to one another;

each of said grooves having a generally rectilinear cross-section, said compliant seal in an uncompressed condition having a generally circular cross-section, said seal substantially compliantly filling said groove upon securement of said case halves to one another;

said materials of said seal body comprising a woven metal core, a fiber, a metallic foil and a protective layer.

4. A case according to claim 3 wherein the diameter of said seal is greater than the depth of the groove to project above the sealing surface thereof prior to securement of said case halves to one another.

5. An inner compressor discharge case for a gas turbine, comprising:

a cylindrical barrel formed of upper and lower halves joined to one another at margins thereof along a horizontal midline to form a pair of diametrically opposed joints along opposite sides of the barrel, each of the margins of one of said halves having a groove extending generally parallel to an axis of the cylindrical barrel, each of the margins of another of said halves having a sealing surface extending generally parallel to the axis of the cylindrical barrel;

a compliant seal disposed in each of said grooves including a seal body formed of multiple layers of different materials for compliantly and sealingly engaging against the margin of said another of said halves upon securing said halves to one another;

each of said grooves having a generally rectilinear cross-section, said compliant seal in an uncompressed condition having a generally circular cross-section, said seal substantially compliantly filling said groove upon securement of said case halves to one another;

said materials of said seal body comprising an inner woven metal core, a silica fiber, a metal foil and a braided metal outer protective layer.

6. A case according to claim 5 wherein the diameter of said seal is greater than the depth of the groove to project above the sealing surface thereof prior to securement of said case halves to one another.

* * * * *

UNITED STATES PATENT AND TRADEMARK OFFICE
CERTIFICATE OF CORRECTION

PATENT NO.   : 6,655,913 B2
DATED        : December 2, 2003
INVENTOR(S)  : Vedantam et al.

It is certified that error appears in the above-identified patent and that said Letters Patent is hereby corrected as shown below:

<u>Column 4,</u>
Line 10, "alone" should read -- along --.

Signed and Sealed this

Twenty-fourth Day of February, 2004

JON W. DUDAS
*Acting Director of the United States Patent and Trademark Office*